Patented June 5, 1951

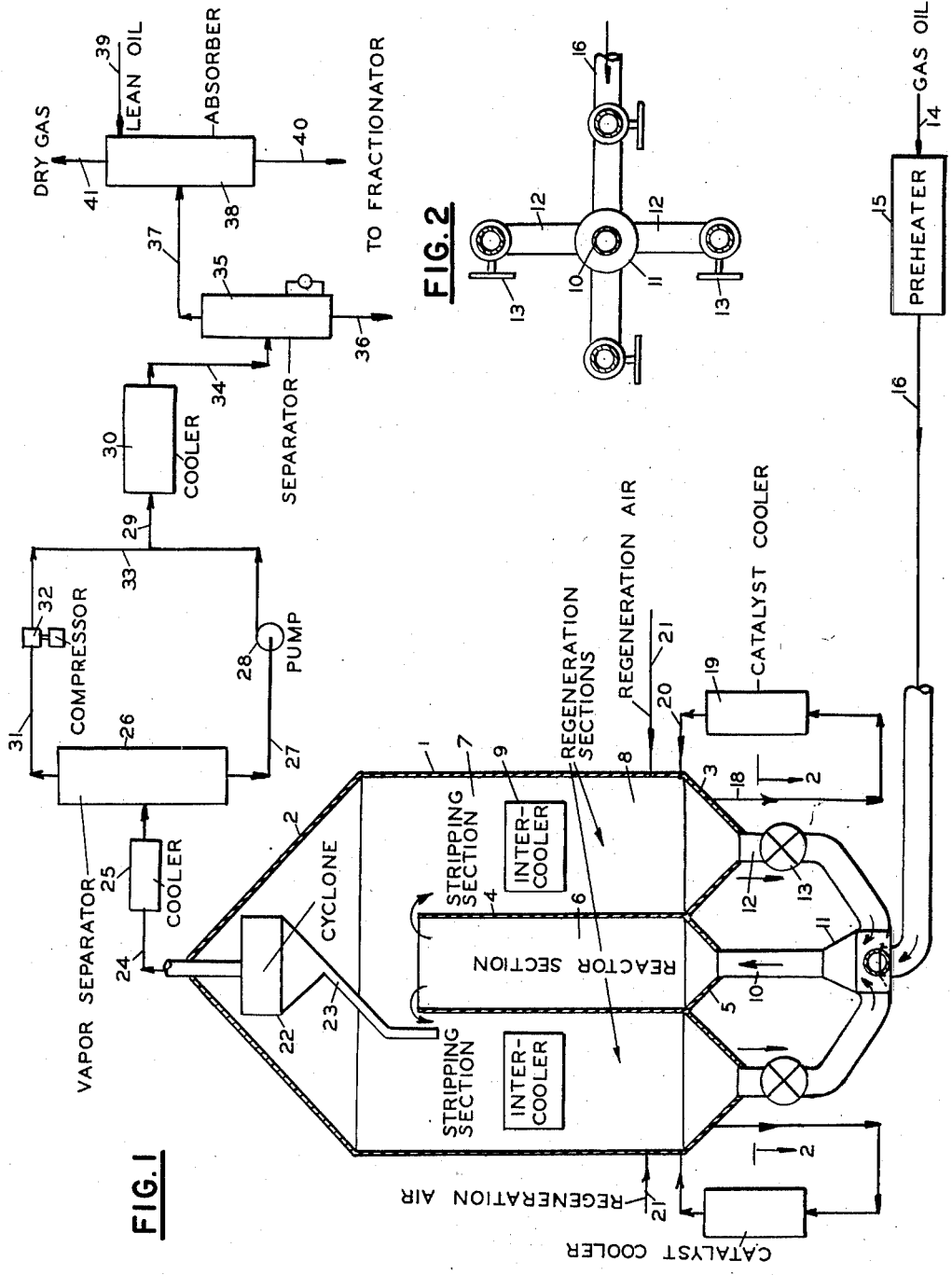

2,556,114

UNITED STATES PATENT OFFICE 2,556,114

PYROLYTIC CONVERSION OF HYDROCARBONS WITH THE AID OF A CATALYST

Reading Barlow Smith, Hammond, Ind., assignor to Sinclair Refining Company, New York, N. Y., a corporation of Maine Application June 27, 1947, Serial No. 757,638

1 Claim. (Cl. 196—52)

This invention relates to the pyrolytic conversion of hydrocarbons with the aid of a catalyst and, more particularly, to pyrolytic conversion processes involving the use of a finely divided solid catalyst.

The invention is especially applicable to conversion processes of the general type wherein a finely divided catalyst is brought into intimate contact with vaporized hydrocarbons to be converted in a reaction zone, spent catalyst is separated from the oil vapors, the separated catalyst stripped of readily vaporizable hydrocarbons by contact with an inert gaseous stripping medium in a stripping zone, regenerated by decarbonization in a regenerating zone and the regenerated catalyst returned to the reaction zone for contact with further hydrocarbon vapors to be converted. Operations of the type described are commonly designated fluid catalyst processes.

In previously proposed operations of fluid catalyst processes, spent catalyst is conveyed from the reaction chamber to a separate stripping chamber wherein the catalyst is stripped of readily vaporizable hydrocarbons by contact with steam. The catalyst is conveyed from the stripping chamber to a third chamber wherein it is renegerated by burning off the carbonaceous deposit therefrom by contact with air and the regenerated catalyst is returned in fluid suspension to the reaction chamber.

A disadvantage of operations of this type has been the large amount of auxiliary equipment necessary, the expense of, and space occupied by, the auxiliary equipment and the difficulties experienced in conveying the catalyst from chamber to chamber.

My present invention provides an improved method of operation whereby the previous objections to fluid catalyst conversion processes are, in large measure, eliminated and also provides apparatus especially adapted to the carrying out of the process.

The invention has the further advantage of avoiding the necessity of the use of steam as a stripping medium. A particularly desirable aspect of my invention is the compactness and simplicity of the operation and apparatus, the reaction, and the stripping and regeneration of the catalyst being effected in a single chamber, heat radiation losses thereby being minimized. Also the problems of conveying the catalyst from one chamber to a succeeding chamber is substantially eliminated.

In operations of this type, the catalyst is usually maintained throughout the system in a fluidized condition. However, the catalyst is normally not of uniform density throughout the various stages of the operation. In both the reaction zone and the regenerating zone, and also in the stripping zone, there is normally maintained a so-called "high density," or "dense phase" body of fluidized catalyst of considerable depth through which the gases and vapors pass and above which the catalyst in relatively low concentration is suspended in the ascending gases and vapors. As previously noted, these dense phase bodies of catalyst in the reaction, stripping and regenerating zones, respectively, are normally maintained in separate chambers, each usually being provided with individual separating means for removing suspended catalyst from the effluent gases and vapors.

In accordance with my present invention, the entire operation is housed within a single chamber, the lower and intermediate portion of the chamber being separated by a partition so as to form a central reaction zone and an outer stripping and regenerating zone, each opening into a common vapor zone at the upper end of the chamber in which the hydrocarbon reaction products become admixed with the gaseous products of regeneration and the stripped hydrocarbon vapors and from which the mixed vapors and gases are withdrawn through a common separator and subsequently treated to recover the hydrocarbon constituents.

Regenerated catalyst and charge oil vapors are continuously passed into the lower end of the central, reaction zone of the chamber, the catalyst separating therein to form a dense phase body and the vapors passing from the upper end of the zone where they become disengaged from the major portion, at least, of the catalyst. The catalyst accumulating in the reaction zone overflows from the upper end thereof into the surrounding zone of the chamber in which stripping and regeneration of the catalyst are successively effected as the dense phase body of catalyst flows downwardly through the surrounding, outer zone. Air, or other oxygen-containing gas, is introduced into the lower end of the outer, surrounding zone, is distributed evenly throughout the transverse area of the dense phase bed of catalyst therein and passes upwardly through the catalyst.

The passage of air upwardly through the hot catalyst results in the burning of the carbonaceous deposit, formed on the catalyst during the reaction, and the resultant gaseous products of combustion continue upwardly through the outer zone finally coming into contact with the spent catalyst overflowing into the outer zone from the reaction zone.

Contact between the hot products of combustion and the spent catalyst results in the stripping therefrom of readily vaporizable hydrocarbons which pass upwardly with the combustion products into the upper vapor space of the chamber.

Regenerated catalyst is withdrawn from the lower end of the outer chamber, is caught up in suspension in the charge oil passing to the system and is carried thereby in suspension upwardly into the lower end of the reaction zone.

It is particularly advantageous in carrying out the process to regulate the air passed to the regenerating zone so that the oxygen content is substantially completely consumed in the regeneration of the catalyst in the lower end of the outer zone of the chamber so that the products of combustion coming into contact with the spent catalyst from the reaction zone will be substantially free from oxygen.

Further, in carrying out the invention, it is particularly advantageous that the gaseous products of combustion be materially cooled before rising to the stripping section of the outer zone of the chamber.

The invention will be more fully described and illustrated with reference to the accompanying drawing which represents conventionally and somewhat diagrammatically, an embodiment of my invention in an apparatus which is substantially cylindrical in transverse section and in which the outer zone of the chamber is in the form of an annulus surrounding the central reaction zone.

Figure 1 of the drawings represents conventionally and partly in vertical section a flow diagram of an operation embodying my invention; and Figure 2 is a horizontal section along the lines 2—2 of Figure 1.

In the drawings, the cylindrical vessel containing the reaction zone, stripping zone, and regenerating zone is indicated by the reference numeral 1. The chamber 1 is closed at its upper end by cone-shaped member 2 and is closed at its lower end by a plurality of cone-shaped hoppers 3.

Coaxially positioned within the chamber 1 is a vertically elongated cylindrical member 4, opening at its upper end into the upper portion of chamber 1 and closed at it lower end by cone-shaped hopper 5. The cylindrical member 4 delineates the reaction zone 6 which is completely surrounded by the stripping and regenerating annular zones 7 and 8, respectively.

Intermediate the stripping zone 7 and the regeneration zone 8, there are a plurality of intercooler, diagrammatically indicated at 9, and which may be composed of cooling coils, or the like, through which a cooling medium is passed in known manner.

A conduit 10 leads upwardly into the hopper bottom of the reaction zone from a manifold 11. The manifold 11 is connected by a plurality of conduits 12 with a lower conical hopper 3 of the regenerating section 8, the conduits 12 being adapted to permit the flow of catalyst downwardly therethrough into manifold 11 at a rate controlled by valves 13. Any desired member of such conduits are provided, each connecting one of the hoppers 3 with the manifold 11.

Hydrocarbon charge oil, gas oil for instance, is charged to the system through line 14, preheater 15 wherein the oil is preheated, and from which it passes through line 16, upwardly into manifold 11 where the hydrocarbon vapors pick up the catalyst passing downwardly through conduits 12 and carry it in suspension upwardly into the lower end of the reactor section 6.

In order to prevent overheating of the catalyst during the regeneration, the catalyst may be continuously withdrawn from the lower end of the regeneration section through lines 18 and passes through cooler 19 and back into the regeneration section through line 20, the flow of the catalyst through the coolers and connections being effected in the conventional manner. The coolers may be of usual type, for instance, waste heat boilers, and any desired number of coolers may be employed, spaced about the periphery of chamber 1.

Conversion of the hydrocarbon charge oil vapors is effected during the passage of vapors upwardly through the body of catalyst in the reactor section 6 and the products of conversion pass into the upper zone of chamber 1. The catalyst overflows from the upper end of the reactor section into the stripping section and gravitates downwardly, passing in contact with the intercoolers and, from thence, to the lower annular regeneration section.

Regeneration air is injected into the lower end of the regeneration section through lines 21, is distributed throughout the transverse section of the regenerator by known means and passes upwardly therethrough in contact with the catalyst, resulting in the burning of the carbonaceous deposit from the catalyst with the evolution of considerable heat. The hot products of combustion pass upwardly in contact with the intercoolers 9 whereby the temperature of the flue gases is reduced to a range suitable for use in the stripping section. The cooled flue gases then pass upwardly through the stripping section and strip from the catalyst therein readily vaporizable hydrocarbons.

The flue gases, together with stripped hydrocarbon vapors, then pass into the upper zone of chamber 1 where they become admixed with the vaporized hydrocarbons from the reactor section.

Mixed vapors and gases pass from the upper end of chamber 1 through a cyclone-type separator diagrammatically indicated at 22 for the separation of suspended catalyst, the catalyst being returned through line 23 to the dense phase body of catalyst in chamber 1 and the gases and vapors pass from the cyclone separator through line 24 and cooler 25 to the vapor separator 26.

In the vapor separator 26, separation of hydrocarbon vapors from liquid hydrocarbons is effected. Liquid hydrocarbons are withdrawn from the lower end of the vapor separator through line 27 and forced, by means of pump 28, into line 29 leading to the cooler 30. Vapors and gases are withdrawn from the upper end of the vapor separator through line 31 to a compressor, or a series of compressors with intervening coolers, indicated at 32. The compressed gases and vapors pass from the compressor through line 33 into line 29 where they are mixed with the liquid hydrocarbons and passed therewith to cooler 30. The cooled mixture passes from the cooler through line 34 to separator 35, of conventional type, wherein the liquid hydrocarbons are separated and pass from the lower end of the separator through line 36 to storage or to a point of further treatment.

Light hydrocarbons and gases pass from the upper end of separator 35 through line 37 to absorber 38 wherein the gases are scrubbed with a lean oil introduced into the upper end of the absorber through line 39. The scrubbing oil, together with absorbed hydrocarbons, passes from the lower end of the absorber through line 40 to a fractionator, not shown, and dried gases are withdrawn from the upper end of the absorber through line 41.

The catalyst employed may be of the conventional type used in fluid catalytic processes, for instance, silica-alumina type catalysts in finely divided or powdered form. The reaction conditions may likewise be those conventionally used for operations of this type and, as understood by the art, the optimum temperatures and pressures will depend primarily upon the type of feed stock used, the particular catalyst employed and the reaction desired.

In cracking gas oil, for instance, the reaction temperature maintained in the reactor section may, with advantage, be within the range of 800 to 1,000° F. and the pressure at the top of chamber 1 within the range of about 5 to 25 pounds per square inch. The regeneration temperature is, with advantage, within the range of 950 to 1,200° F., heat for the reaction being supplied in large measure, at least, by heat liberated in the regeneration of the catalyst. Heat passes to the reaction zone through the partition 4 as well as being carried thereto by the hot regenerated catalyst and the preheated charge oil. A more uniform temperature is thereby maintained in the reaction zone.

I claim:

In the fluid catalyst process for the conversion of hydrocarbons in which the hydrocarbons to be converted are passed in intimate contact with the catalyst in a reaction zone, spent catalyst is passed from the reaction zone to a stripping zone wherein it is stripped of readily vaporizable hydrocarbons and passed from thence to a regenerating zone wherein the carbonaceous deposit formed on the catalyst during conversion is burned off by contact with air, the improvement comprising effecting the reaction, stripping and regeneration in separate zones of a single chamber, the reaction zone of the chamber opening into the upper end of the chamber, said reaction zone being surrounded by and in heat exchange relation with the stripping and regenerating zones and the regenerating zone being positioned beneath the stripping zone, withdrawing hot regenerated catalyst from the lower end of the regenerating zone, suspending it in charge oil and passing the suspension upwardly into the reaction zone, causing the spent catalyst to overflow from the upper end of the reaction zone into the stripping zone and to gravitate downwardly through the stripping and regenerating zones, passing air into the lower end of the regenerating zone and upwardly therethrough in contact with the hot catalyst, whereby the carbonaceous deposit is burned to form gaseous products of combustion, separately cooling all of the products of combustion emerging from the regenerating zone, and passing these cooled gases upwardly through the catalyst in the stripping zone, whereby the catalyst is stripped of readily vaporizable hydrocarbons, collecting vapors and gases from the reaction, the stripping and the regeneration in the upper portion of the chamber, and then withdrawing the mixed vapors and gases therefrom and separating the hydrocarbons from the mixture.

READING BARLOW SMITH.

REFERENCES CITED

The following references are of record in the file of this patent:

UNITED STATES PATENTS

| Number | Name | Date |
|---|---|---|
| 2,350,730 | Degnen et al. | June 6, 1944 |
| 2,378,342 | Voorhees et al. | June 12, 1945 |